Sept. 5, 1950
E. R. KENISON
2,521,067
VARIABLE SPEED REDUCER
Filed Sept. 11, 1945
3 Sheets-Sheet 2
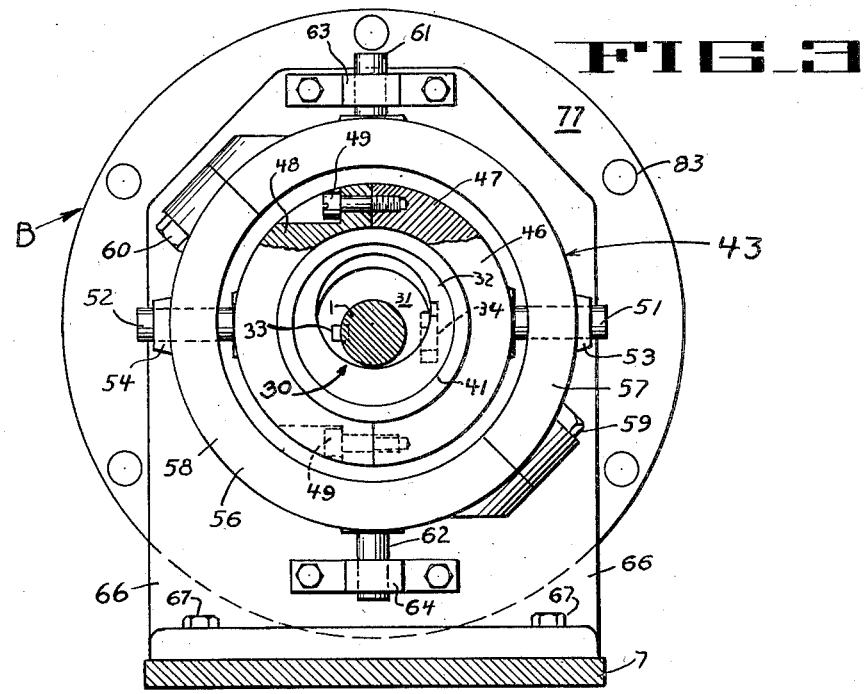
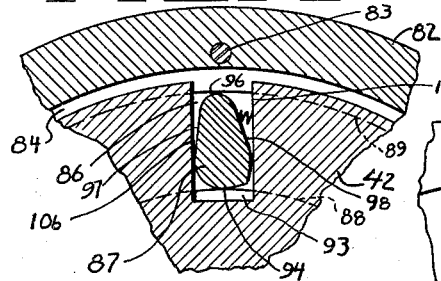
ELDEN R. KENISON.
By Hans G. Hoffmeister
Attorney Sept. 5, 1950          E. R. KENISON          2,521,067
VARIABLE SPEED REDUCER
Filed Sept. 11, 1945          3 Sheets-Sheet 3
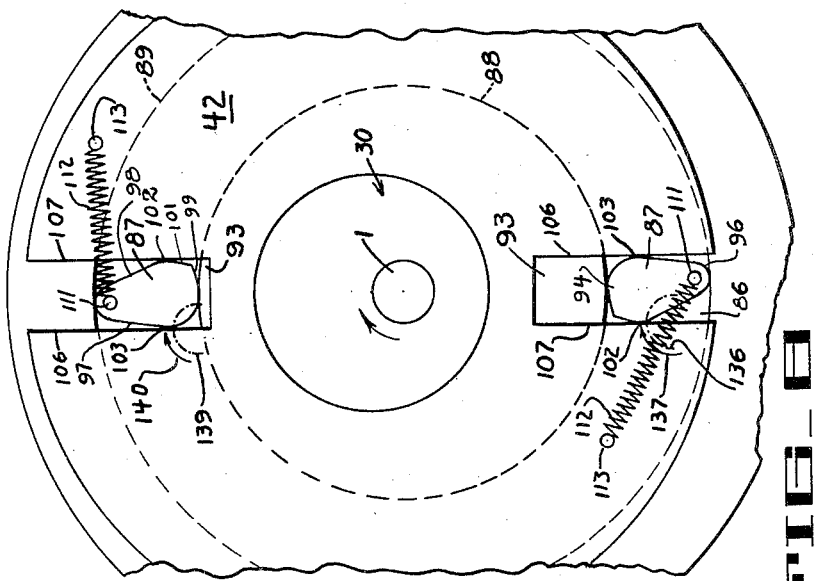
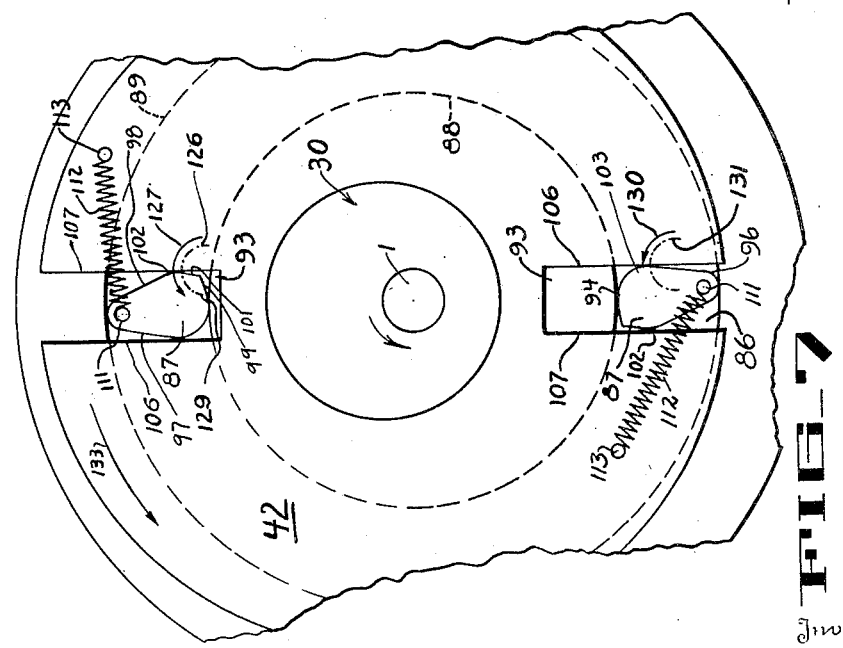
ELDEN R. KENISON.
By Hans G. Hoffmeister
Attorney

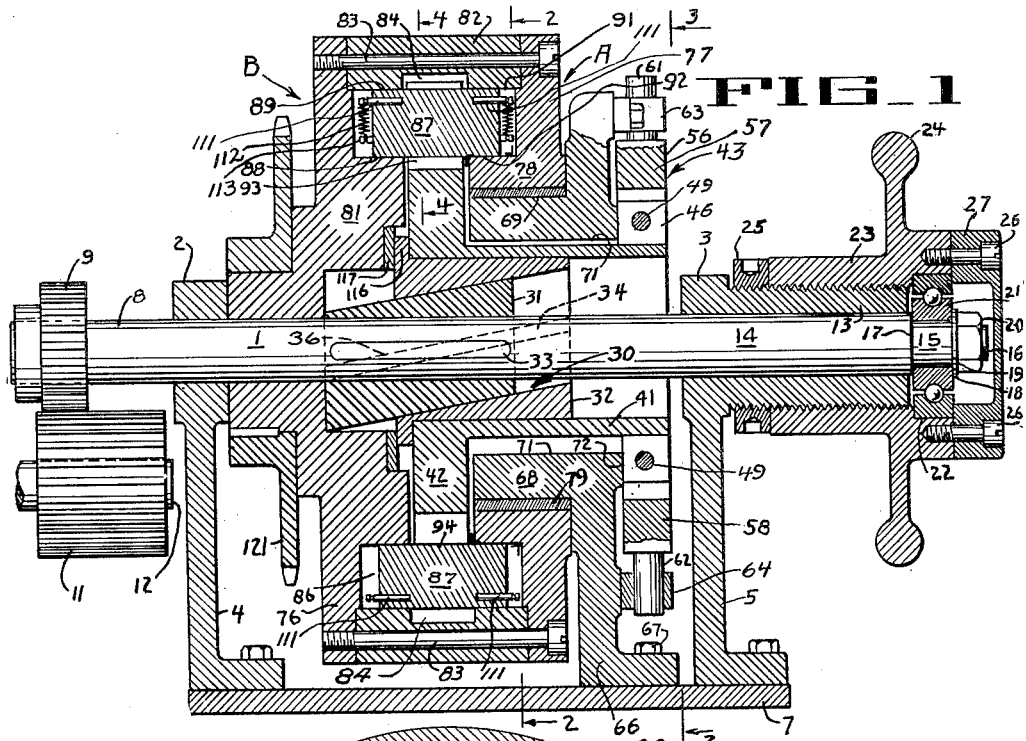

Patented Sept. 5, 1950

2,521,067

UNITED STATES PATENT OFFICE 2,521,067

VARIABLE-SPEED REDUCER

Elden R. Kenison, San Jose, Calif.

Application September 11, 1945, Serial No. 615,612

17 Claims. (Cl. 74—117)

The present invention relates to a variable speed reducer.

One object of the present invention is to provide a speed reducer of a high speed reduction ratio.

Another object is to provide a speed reducer the speed reduction ratio of which may be varied during the operation of the device.

Another object is to provide a speed reducer wherein the pulsations of the output unit are reduced to a minimum.

Another object is to provide a speed reducer wherein the direction of rotation of the output unit remains the same irrespective of the direction of rotation of the input unit.

Another object is to provide a speed reducer of simple inexpensive construction and efficient operation.

Other and further objects and advantages of the present invention will become apparent from the following description and drawings in which:

Fig. 1 is a longitudinal section of the speed reducer of the present invention.

Fig. 2 is a transverse section of Fig. 1 taken along line 2—2 thereof.

Fig. 3 is a transverse section of Fig. 1 taken along line 3—3 thereof.

Fig. 4 is an enlarged section through a portion of Fig. 1 taken along line 4—4 thereof.

Figs. 5 and 6 are diagrammatic views showing a power transmitting cam in different looking positions.

Fig. 7 is a schematic view illustrating the operation of the speed reducer when the input unit is rotated in counterclockwise direction.

Fig. 8 is a view similar to Fig. 7 but illustrating the operation of the speed reducer when the input unit is rotated in clockwise direction.

The speed reducer of the present invention (Figs. 1 to 3) comprises an input unit A, and an output unit B. The input unit A comprises a high speed input shaft 1 rotatably mounted within bearings 2 and 3 (Fig. 1) supported by standards 4 and 5, respectively, mounted upon a base 7. Keyed to one end 8 of the input shaft 1 is a gear 9 which meshes with a wide gear 11 keyed to the shaft 12 of an electric motor or any other prime mover the speed of which is to be reduced by the mechanism of the present invention.

The bearing 3 includes an externally threaded sleeve portion 13 through which the other end 14 of the shaft 1, which is provided with reduced portions 15 and 16, extends. Positioned upon the shaft portion 15 intermediate the shoulder 17 and retaining washer 18 bearing against the shoulder 19 and held in position by a nut 20, threadedly secured to the shaft portion 16, is a thrust ball bearing 21. The outer run of the ball bearing 21 is received within an annular recess 22 of an internally threaded hub portion 23 of a hand wheel 24. The hub portion 23 is screwed upon the externally threaded bearing sleeve 13 and is normally held in desired position against rotation by means of a lock nut 25. Secured to the outer end of the hub portion 23 by means of screws 26 is a cap 27 which retains the thrust bearing 21 within the recess 22 and firmly secures the bearing 21 to the hub 23 for longitudinal movement therewith.

Mounted upon the shaft 1 is an eccentric actuating unit 30 comprising eccentric sleeves 31 and 32. The eccentric sleeve 31 is fixed to the shaft 1 for rotation therewith and held against longitudinal movement relative thereto by means of a key 33. The sleeve 31 is slidably mounted within the eccentric sleeve 32 and held against rotation relative thereto by means of a key 34 fixed to sleeve 32 and slidably received within a keyway 36 of the sleeve 31 so that both eccentric sleeves 31 and 32 are interconnected for simultaneous rotation. The key 34 and keyway 36 as well as the inner face of the sleeve 32 and outer face of the sleeve 31 are disposed in an inclined position relative to the shaft 1 in such a manner as to permit axial movement of the shaft 1 and sleeve 31 relative to the sleeve 32 whereby the eccentricity of the sleeve 32 with respect to the shaft 1, i. e., the eccentricity of the eccentric unit 30, may be varied as desired.

The sleeve 32 is rotatably received within the concentric bore of the hub portion 41 of a power transmitting or drive disk 42. This disk is solely supported by the eccentric sleeve 32 but is held against rotation by means of a holding device 43.

This holding device (Figs. 1 and 3) comprises an inner ring 46 which includes two semi-circular sections 47 and 48 secured to each other and securely clamped to the hub portion 41 of the disk 42 by means of cap screws 49. Secured to the inner ring 46 are horizontally disposed pivot pins 51 and 52 slidably mounted within bearings 53 and 54, respectively, of an outer ring 56 comprising two semi-circular portions 57 and 58 secured to each other by cap screws 59 and 60. The outer ring 56 is provided with vertically disposed pivot pins 61 and 62 slidably mounted within bearings 63 and 64, respectively.

The bearings 63 and 64 are attached to a bracket 66 which is secured to the base 7 by screws 67 (Figs. 1 and 3). Formed integral with the bracket 66 is a bearing flange 68 having an outer annular bearing surface 69 and a bore 71 which extends through the entire bracket structure. One end of the bracket 66 is provided with an annular bearing face 72 against which the inner side of the ring 46 abuts. The hub portion 41 of the transmission disk 42 extends through the bore 71 and the diameter of the latter is such as to permit free floating movement of the disk 42 and its hub portion 41 in a circular orbit during the rotation of the unit 30, i. e., the eccentric sleeves 31 and 32.

As above stated the holding device 43 prevents rotation of the disk 42 and its hub portion 41 but due to the fact that the inner ring 46 is horizontally movable relative to the outer ring 56 and the outer ring 56 is vertically movable with respect to the bracket 66 free floating movement of the transmission disk 42 relative to the bracket 66 within the bore 71 thereof is permitted.

The output unit B comprises a driven member 76 which includes an inner ring 77 provided with a hub portion 78 having a bearing sleeve 79 rotatably mounted upon the annular bearing surface 69 of the bracket 66 and an outer disk 81 rotatably mounted upon the input shaft 1. The inner ring 77 and the disk 81 are interconnected adjacent their peripheries by a sleeve 82 secured thereto by screws 83. The sleeve 82 is received within a recessed portion of the inner ring 77 and outer disk 81 so that it is held in correct position relative thereto. The inner surface of the sleeve 82 is provided with an annular recess 84 of sufficient depth and width to permit free floating movement of the transmission disk 42. The inner ring 77 and the disk 81 are of such configuration as to receive the disk 42 for free floating movement therebetween and to provide an annular race or camway 86 for the reception of a plurality of cams or wedges 87 disposed between bearing surfaces 88, 89, 91 and 92 of the disk 81, sleeve 82 and inner ring 77, respectively. These cams 87 extend through rectangular slots 93 in the drive disk 42 which are of sufficient depth so that the disk 42 may float relative to the wedges without contacting the bottom portion 94 thereof.

Each of the cam members 87 is of oblong construction in cross section and comprises a small curved upper cam portion 96 (Fig. 5), and straight side portions 97, 98 joined by curved large cam portion 99, a straight portion 101 and a curved ridge 102. The cross sectional width of the lower portion of the cams 87 between the upper end of the curved portion 103 and ridge 102 thereof corresponds substantially to the width of the slots 93 so that the lower portion of the cams 87 is held between the side walls 106, 107 of the slots 93 but is free to rotate relative thereto (Fig. 5).

The height of the cams 87 is such that when they are disposed in a position as shown in Fig. 5 they are firmly wedged between the bearing surface 89, 91 and 88, 92 of the sleeve 82, disk 81 and ring 78, respectively.

The cams 87 are provided with pins 111 at each side adjacent their upper ends. Attached to each pin is one end of a coil spring 112 which is secured with its other end to pins 113 secured to the disk 42 at each side thereof. The coil springs 112 hold the upper curved surface 96 of the cams or wedges 87 in engagement with the bearing faces 89 and 91 so that when pressure is exerted against the ridge 102 of the cams 87 by the side walls 107 of the slots 93 the cams are slightly shifted in the direction of arrow 114 (Fig. 5) and are firmly wedged between the bearing faces 88, 89 and 91, 92 of the disk 81, ring 77 and sleeve 82 whereby driving connection between the disk 42 and ring 77, sleeve 82 and disk 81 is established.

The eccentric sleeve 32 previously referred to is provided with an annular shoulder 116 disposed between the disk 42 and a bearing surface 117 of the disk 81 for free rotation and floating movement relative thereto. This shoulder, however, prevents longitudinal movement of the sleeve 32 with respect to disks 42 and 81 and the sleeve 31.

Keyed to the disk 81 is a gear or a sprocket wheel 121 from which the reduced output speed is obtained and transferred to any mechanism adapted to be operated by the speed reducer of the present invention.

From the above it will therefore be seen that upon rotation of the motor shaft 12 and gear 11 in clockwise direction the gear 9, input shaft 1 and eccentric unit 30, which comprises sleeves 31 and 32, are driven in counter-clockwise direction, i. e., in the direction of arrow 125 (Fig. 2). Due to the eccentric position of the sleeve 32 with respect to the input shaft 1 the disk 42, which is held against rotation by the holding unit 43, is caused to float in a circular orbit relative to the input shaft 1 and the output unit B. During each revolution of the input shaft 1 and eccentric unit 30, the disk 42 floats once through its circular orbit and moves relative to the cams or wedges 87 which do not float therewith but are shifted forward and backward thereby between the bearing faces 88, 89 and 92, 91 of the output unit B at opposite sides of the disk 42.

During the floating movement of the disk 42 as above described the side faces 106 and 107 adjacent each slot 93 of the disk 42 travel in a circular orbit corresponding to the circular orbit of the disk 42. Each side face 107 exerts therefore during that portion of its circuitous travel which is directed toward the ridge 102 of the cam 87 associated therewith, i. e., during its travel through the outer half 126 of its circuitous path (indicated in dot-dash line in Fig. 7) a pressure stroke against the ridge 102 of the cam in the direction of arrow 127 (Figs. 5 and 7) whereby the lower portion of the cam is shifted in the direction of arrow 114 (Figs. 2 and 5) while the upper portion of the cam is held back by the action of the spring 112 so that the cam is wedged between the bearing faces 88, 89 and 92, 91 of the output unit B and a firm driving connection between the disk 42 and the output unit B is established. The output unit B is therefore rotated in a counter-clockwise direction by the motion imparted thereto through cams 87 by the disk faces 107 during their floating movement through the outer half of their circuitous orbits. At the end 129 (Fig. 7) of the travel of each face 107 through the outer half of its circuitous path the forward movement of the cam associated therewith and the pressure against the ridge 102 thereof ceases so that the cam is unlocked or released from its wedging action between the faces 88, 89 and 92, 91 of the output unit due to the rotative advancement of the output unit B relative to the cam and pressure subsequently exerted in the direction of arrow 130 (Figs. 5 and 7) against the portion 103 of the cam by the disk face 106 as the same travels through the inner half 131 of its circuitous path (indicated in dot-dash line in Fig. 7) and floats backward relative to the direction of rotation of the portion of the output unit B adjacent thereto. The cam 87 is therefore shifted backward until its next forward movement commences when the disk face 107 floats again through its outer half of its circuitous path and the same operation as above described is repeated.

In this manner the cams 87 are successively locked to and unlocked from the output unit B and are shifted forward and backward respectively, relative to the direction of rotation of the output unit B by the floating movement of the disk 42 in a counter-clockwise orbit whereby successive counter-clockwise power impulses are imparted to the output unit B by the cams 87 so that a continuous rotation of the output unit B in counterclockwise direction i. e., in the direction of arrow 133 (Figs. 2 and 7) is effected.

When the input shaft 1 and eccentric unit 30 are rotated in a clockwise direction, as diagrammatically illustrated in Fig. 8, the direction of rotation of the output unit B remains the same as in the case of Fig. 7, i. e., counter-clockwise. This is due to the fact that in such case as clearly shown in Fig. 8 pressure is applied to the ridges 102 of the cams 87 by the disk faces 107 during their travel through the inner half 136 of their circuitous paths (indicated in dot-dash line in Fig. 8). In other words in such case pressure is exerted in the direction of arrow 137 (Fig. 8) against the ridges 102 of each cam 87 as the disk face 107 cooperating therewith travels through the inner half 136 of its orbit whereby the cams 87 are successively wedged between the bearing faces 88, 89 and 92, 91 of the output unit B and the same is driven in a counter-clockwise direction. The cams 87 are released and unlocked from driving engagement with the output unit B and moved backward to their original position while the disk faces 106 float through the outer half of their orbits (indicated at 139 in dot-dash line in Fig. 8), and the output unit B travels ahead of the cams 87 and pressure is exerted by the disk faces 106 against the portions 103 of the cams in the direction of arrow 140 (Fig. 8) thereby unlocking the cams.

From the above it is therefore apparent that the direction of rotation of the output unit B cannot be changed unless the position of the springs 112 and the cams 87 within slots 93 is reversed so that the ridges 102 are adjacent and faces 106 of the disk 42 and the springs urge the cams in opposite directions.

The tension of the springs 112 is so calibrated that the cams 87 are always held in readiness for locking engagement with the annular bearing faces 88, 89, 92, and 91 of the output unit B but are sufficiently loose to freely move backward, i. e., against the rotation of the output unit B to permit their return in unlocked postion after each power stroke of the cams until they are wedged again in locked position to the output unit B upon commencement of the next power stroke.

In order to simplify the above explanation of the operation of the speed reducer of the present invention it has been assumed that the cams 87 are in their locked position while the disk faces 107 travel through the entire outer half 126 (Fig. 7) or through the entire inner half 136 (Fig. 8) of their orbits. Actually, however, the locking action occurs only during a portion of this travel.

To explain this move specifically it should be noted that if shaft 1 is driven counter-clockwise (Fig. 7) each cam 87 will not receive the necessary locking pressure from the disk face 107 until the speed of travel of the latter equals or exceeds the speed of rotation of the output unit B. If the outer half 126 of the orbit 126 (Fig. 7) is divided in the same manner as a clock dial each cam will be firmly wedged between the annular faces of the output unit B at about 1 o'clock and from about 1 o'clock to about 11 o'clock the output unit B is driven by the cam since the speed of the cam is the same or slightly in excess of the speed of rotation of the output unit. At about 11 o'clock the ouput unit B begins to run ahead of the cam and the cam begins to unlock.

When the shaft 1 is driven clockwise the locking action takes place from about 11 o'clock to about 1 o'clock in a similar manner as above described.

Both of the above examples are only illustrations and the locking distances of the cams may vary considerably from those stated herein.

The curved large cam portion 99 of the cams 87 (Figs. 5 and 6) previously referred to comprises a circular section 99a and a slightly curved section 99b which extends substantially tangential to the circular section 99a and forms the continuation thereof. The cam section 99b terminates at the lower edge 101a of the straight cam portion 101. It is therefore apparent that if the annular faces 88, 89, 91 and 92 have worn down during the continuous use of the device of the present invention, i. e., the spacing between opposing faces 88, 89 and 92, 91 has increased the wedging action of the cams is not lost since this increase in spacing between said faces is automatically compensated for as the cam portion 99 contacts the faces 88 and 92 with its slightly curved portion 99b more and more toward the edge 101a. Fig. 5 illustrates the normal locking position of one of the cams 87 while Fig. 6 shows the locking position thereof after considerable wear of the annular faces 88, 89, 92 and 91. In either case a firm wedging of the cam is obtained as long as the straight sides 98 or 101 of the cam do not touch the disk face 107 adjacent thereof.

In the device illustrated eight cams or wedges 87 have been employed. It is to be understood however that their number may be increased or decreased as desired. It is preferred however that a sufficient number of cams 87 is employed to obtain an overlapping operation of the same so that any appreciable pulsation of the output unit B is prevented and a smooth and continuous rotation thereof is obtained.

The device of the present invention is especially adaptable for very high speed reduction since reduction ratios of 50:1 to 150:1 or higher may be obtained. The ratio of the obtained speed reduction depends of course upon the eccentricity of the eccentric unit 30, i. e., the eccentricity of the sleeve 32 with respect to the input shaft 1. Therefore by varying the eccentricity of the sleeve 32 relative to the shaft 1 with infinitesimal increments speed regulation is obtained. The desired variation of the eccentricity of the sleeve 32 with respect to the input shaft 1 is accomplished by unlocking the lock-nut 25 and turning the hand wheel 24 so as to shift the input shaft 1 and the inner eccentric sleeve 31 relative to the outer eccentric sleeve 32 in one or the other direction whereby the speed reduction ratio of the device is increased or reduced. During the axial shifting of the shaft 1 the gear 9 slides relative to the gear 11 which is of sufficient width to always remain in driving engagement with the gear 9. After the desired speed ratio adjustment the hand wheel 24 is locked in its position by the locknut 25. This speed ratio adjustment may be made during operation of the speed reducer so that it is not necessary to stop the machinery driven thereby.

While I have described a particular embodiment of the present invention, it will be understood however that various changes and modifications may be made in the details thereof without departing from the spirit and scope of the appended claims.

Having thus described my invention, what I claim as new and desire to protect by Letters Patent is:

1. A speed reducer comprising a rotatable driven element provided with an annular race having opposing annular faces, a cam disposed in said race and movable into and out of locking engagement with the opposing faces of said race, a driving element straddling said cam and mounted for floating movement relative to said driven element, and means for effecting floating movement of the driving element in a circular orbit relative to the driven element to successively lock and unlock the cam relative to the opposing faces of the race of the driven element to thereby translate the floating movement of the driving element into rotation of the driven element.

2. A speed reducer comprising a rotatable driven element provided with an annular race having opposing annular faces, a plurality of cams disposed in said race and movable into and out of locking engagement with the opposing annular faces of said race, a driving element adjacent said driven element, said driving element having a plurality of radial slots for slidably receiving the cams therein, and means for effecting floating movement of said driving element relative to the driven element and to successively lock the cams to and unlock them from said faces to thereby translate the floating movement of the driving element into rotation of the driven element.

3. A speed reducer comprising a rotatable driven element provided with an annular race having opposing annular walls, a plurality of cams slidably disposed in said race and movable into and out of locking engagement with the opposing walls thereof, a driving element adjacent said driven element and provided at its periphery with a plurality of radially extending slots for receiving the cams laterally movable and radially slidable therein, and means for effecting floating movement of the driving element in a circular orbit relative to the driven element to successively lock and unlock the cams between the opposing walls of said race to thereby translate the floating movement of the driving element into rotation of the driven element.

4. A speed reducer comprising a rotatable driven element provided with an annular race, a plurality of cams disposed in said race movable into and out of locking engagement with said driven element, a driving element adjacent said driven element and operatively associated with the cams for actuating the same, means for effecting floating movement of said driving element in a circular orbit relative to the driven element to lock and unlock the cams relative to the driven element and to translate the floating movement of the driving element into rotation of the driven element, resilient means for continuously holding said cams in frictional engagement with said race, and means for varying the extent of circular floating movement of the driving element relative to the driven element to vary the speed of rotation of the latter.

5. A speed reducer comprising a rotatable driven element provided with an annular race, a plurality of cams disposed in said race movable into and out of locking engagement with said driven element, a driving element adjacent said driven element and provided with a plurality of radially disposed slots in its periphery for receiving the cams intermediate their ends therein, and means for effecting floating movement of said driving element in a circular orbit relative to the driven element to lock and unlock the cams in successive order relative thereto and to translate the floating movement of the driving element into continuous rotation of the driven element.

6. A speed reducer comprising a rotatable driven unit provided with an annular race, a plurality of wedges disposed in said race, said wedges being freely slidable along said race and laterally tiltable therein into and out of locking engagement therewith, a driving disk extending with its periphery into the annular race of the driven unit said disk being provided with radially disposed slots for receiving said wedges therein, means for preventing rotation of said disk, and means for effecting floating movement of said disk in circular orbit relative to the driven unit to shift said wedges back and forth in said race and to unlock and unlock the wedges in successive order and overlapping relation therein to thereby translate the floating movement of the disk into continuous rotation of the driven unit.

7. A speed reducer comprising a driving unit, a rotatable driven unit adjacent the same and provided with an annular race, a plurality of wedges disposed in said race for sliding movement therein and laterally tiltable into and out of locking engagement therewith, said driving unit extending into said race and being provided with a plurality of slots extending radially relative to said race for receiving said wedges therein, said slots being of sufficient length radially of said race to permit floating movement of the driving unit relative to the driven unit, and means for effecting floating movement of the driving unit in a circular orbit relative to said driven unit to thereby tilt said wedges laterally back and forth to lock and unlock said wedges in said race in successive order and to impart rotation to said driven unit when said wedegs are locked in said race.

8. A speed reducer comprising a driving disk provided with a plurality of radially disposed slots, a rotatable member adjacent said disk and provided with an annular race having opposing faces, a plurality of wedges slidably disposed in said race and movable into and out of locking engagement with said faces and extending into the slots of said disk, and means for effecting circular floating movement of said disk relative to said rotatable member to thereby shift said wedges back and forth in said race and to lock and unlock the same in successive order between the opposing faces thereof during their forward and backward movement, respectively, and to translate the floating movement of said disk into rotative movement of the rotatable member.

9. A speed reducer comprising a rotatable output unit provided with spaced annular faces forming a continuous annular race, a plurality of cams slidably disposed in spaced relation in said race and movable therein into and out of locking engagement with said faces, a drive disk disposed within said output unit and extending into said annular race, said disk being provided with a plurality of radially extending slots at its periphery for receiving a portion of said cams therein, said slots being of sufficient length to permit floating movement of the disk relative to the cams within said output unit, and means for effecting circular floating movement of said disk relative to the axis of rotation of the output unit for successively forcing the cams into and out of locking engagement with the faces of said race, for translating the floating movement of the disk into rotation of the output unit.

10. A speed reducer comprising a rotatable driven element provided with spaced annular races disposed adjacent each other, a plurality of cams slidably disposed with their free ends in said races and movable therein into and out of locking engagement with said driven element, a driving element mounted for circular floating movement between adjacent races of said driven element and provided with a plurality of radially extending slots straddling said cams intermediate their ends, the radial extension and the width of said slots being such as to permit free floating movement of said driving element relative to said cams and driven element, means associated with said driving element for preventing rotation thereof without impeding free floating movement of said driving element, and means for effecting floating movement of said driving element in a circular path about the axis of rotation of the driven element to successively lock and unlock the cams with respect to the driven element and to translate the circular floating movement of the driving element into rotation of the driven element.

11. A speed reducer comprising a rotatable driven element provided with spaced annular races disposed adjacent each other, a plurality of cams slidably disposed with their free ends in said races and movable therein into and out of locking engagement with said driven element, a driving element mounted for circular floating movement between adjacent races of said driven element and provided with a plurality of radially extending slots straddling said cams intermediate their ends, the radial extension and the width of said slots being such as to permit free floating movement of said driving element relative to said cams and driven element, means associated with said driving element for preventing rotation thereof without impeding free floating movement of said driving element, means for imparting floating movement to said driving element in a circular path about the axis of rotation of the driven element to successively lock and unlock the cams with respect to the driven element and to translate the circular floating movement of the driving element into rotation of the driven element, and means for varying the path of circular movement of said driving element to vary the speed of rotation of the driven element.

12. A speed reducer comprising a rotatable driven element provided with spaced annular races disposed adjacent each other, a plurality of cams slidably disposed with their free ends in said races and movable therein into and out of locking engagement with said driven element, a driving element mounted for circular floating movement between adjacent races of said driven element and provided with a plurality of radially extending slots straddling said cams intermediate their ends, resilient means associated with said cams and driving element for urging said cams in said races into frictional engagement with said driven element, the radial extension and the width of said slots being such as to permit free floating movement of said driving element relative to said cams and driven element, means associated with said driving element for preventing rotation thereof without impeding free floating movement of said driving element, and means for imparting floating movement to said driving element in a circular path about the axis of rotation of the driven element to successively lock and unlock the cams with respect to the driven element and to translate the circular floating movement of the driving element into rotation of the driven element.

13. A speed reducer comprising a rotatable driven element provided with spaced annular races disposed adjacent each other, a plurality of cams slidably disposed with their free ends in said races and movable therein into and out of locking engagement with said driven element, a driving element mounted for circular floating movement between said races and provided with a plurality of radially extending slots straddling said cams intermediate their ends, resilient means associated with said cams and driving element for urging said cams in said races into frictional engagement with said driven element, the radial extension and the width of said slots being such as to permit free floating movement of said driving element relative to said cams and driven element, means associated with said driving element for preventing rotation thereof without impeding free floating movement of said driving element, means for imparting floating movement to said driving element in a circular path about the axis of rotation of the driven element to successively lock and unlock the cams with respect to the driven element and to translate the circular floating movement of the driving element into rotation of the driven element, and means for varying the path of circular floating movement of said driving element to vary the speed of rotation of the driven element.

14. A speed reducer comprising a rotatable driven unit provided with an annular race, a plurality of wedges disposed in said race and extending laterally therefrom, said wedges being freely slidable in said race and movable into and out of locking engagement with the driven unit, a driving disk adjacent said driven unit and provided with a plurality of slots for movably receiving the lateral extensions of said wedges therein, means for preventing rotation of said disk, resilient means associated with said wedges and disk for urging said wedges into frictional engagement with said driven unit, and means for effecting universal floating movement of said disk in a circular orbit relative to the driven unit to lock and unlock the wedges in successive order and overlapping relation relative thereto to thereby translate the floating movement of the disk into continuous rotation of the driven unit.

15. A speed reducer comprising a rotatable driven element provided with an annular race having opposing cam engaging faces, a plurality of cams disposed in said race and movable into and out of locking engagement with the opposing faces thereof, a driving element adjacent said driven element and operatively associated with the cams, and means for effecting floating movement of said driving element in a circular orbit relative to the driven element for shifting said cams back and forth in said race and for locking and unlocking said cams with the opposing faces thereof to thereby translate the floating movement of the driving element into rotation of the driven element.

16. A speed reducer comprising a driving disk provided with a plurality of slots, said slots extending radially into said disk from its periphery to provide opposing cam engaging sides on said disk, a rotatable member adjacent said disk and provided with opposing annular faces on its side forming an annular race, a cam disposed in each of said slots and extending into said annular race, said cams being laterally tiltable into and out of locking engagement with said annular faces, and means for imparting circular floating movement to said disk to move the cam engaging sides of said disk in a circular orbit relative to said race to shift the cams back and forth between said annular faces and to tilt the cams laterally into and out of locking engagement therewith to thereby translate the floating movement of the disk into rotative movement of the rotatable member.

17. A speed reducer comprising a driving disk provided with a plurality of slots, said slots extending radially into said disk from its periphery to provide opposing cam engaging sides on said disk, a rotatable member adjacent said disk and provided with opposing annular faces on its side forming an annular race, a cam disposed in each of said slots and extending into said annular race and movable into and out of locking engagement with said annular faces, means for imparting circular floating movement to said disk to move the cam engaging sides of said disk in a circular orbit relative to said race to lock the cams to the annular faces of the rotatable member during movement of the cam engaging sides of the disk through one portion of their orbit and to unlock the cams from said faces during movement of the cam engaging sides through the remainder of their orbit to thereby translate the floating movement of the disk into rotative movement of the rotatable member, and means for varying the extent of floating movement of said disk relative to the rotatable member to vary the speed of rotation of the latter.

ELDEN R. KENISON.

REFERENCES CITED

The following references are of record in the file of this patent:

UNITED STATES PATENTS

| Number | Name | Date |
|---|---|---|
| 867,136 | Jackson | Sept. 24, 1907 |
| 977,449 | Hayden | Dec. 6, 1910 |
| 1,572,360 | Peterson | Feb. 9, 1926 |
| 1,700,562 | Doll | Jan. 29, 1929 |
| 2,186,395 | Staude | Jan. 9, 1940 |

FOREIGN PATENTS

| Number | Country | Date |
|---|---|---|
| 21,297 | Great Britain | A. D. 1905 |
| 371,667 | Great Britain | Apr. 28, 1932 |